United States Patent [19]

Neiman

[11] 4,245,751
[45] Jan. 20, 1981

[54] ANTI-THEFT FILLER CAP

[75] Inventor: Michel Neiman, Paris, France

[73] Assignee: Societe de Diffusion Neiman, Courbevoie, France

[21] Appl. No.: 60,087

[22] Filed: Jul. 24, 1979

[30] Foreign Application Priority Data

Jul. 28, 1978 [FR] France .............................. 78 22344

[51] Int. Cl.³ ............................................ B65D 51/16
[52] U.S. Cl. .................................... 220/204; 220/210; 220/303; 220/DIG. 33
[58] Field of Search ....... 220/203, 204, 303, DIG. 32, 220/DIG. 33, 210

[56] References Cited

U.S. PATENT DOCUMENTS

| 3,858,751 | 1/1975 | Gerges | 220/210 |
| 3,974,936 | 8/1976 | Gerdes | 220/DIG. 32 |

FOREIGN PATENT DOCUMENTS 2216483 10/1973 Fed. Rep. of Germany ........... 220/210

Primary Examiner—Allan N. Shoap
Attorney, Agent, or Firm—James C. Wray

[57] ABSTRACT

An anti-theft cap for closing a filler pipe of a vehicle fuel tank is provided having a body shaped to locate within the end of the filler pipe and a cover portion having sealing means to engage the end of the filler pipe. A cylinder lock mounted in a bore of said body serves to lock and unlock the cap. A carrier member is connected to said cylinder lock so as to rotate therewith between a locked position and an unlocked position. Two conduits are formed in said body diametrically opposite each other and each have one end at a surface of said body and the other end at another surface which other end communicates with the interior of the filler pipe when the cap is in position thereon.

A first valve carried by said carrier member communicates at one end thereof with the atmosphere and at the other end thereof with said one end of its respective conduit when said carrier is in said locked position, whereby vapor from the tank may be vented when the pressure in the tank exceeds a predetermined value. A second valve device carried by said carrier member communicates at one end thereof with the atmosphere and at the other end thereof with said one end of its respective conduit when said carrier is in the locked position, whereby air can enter the tank when the pressure therein falls below a predetermined value.

3 Claims, 4 Drawing Figures

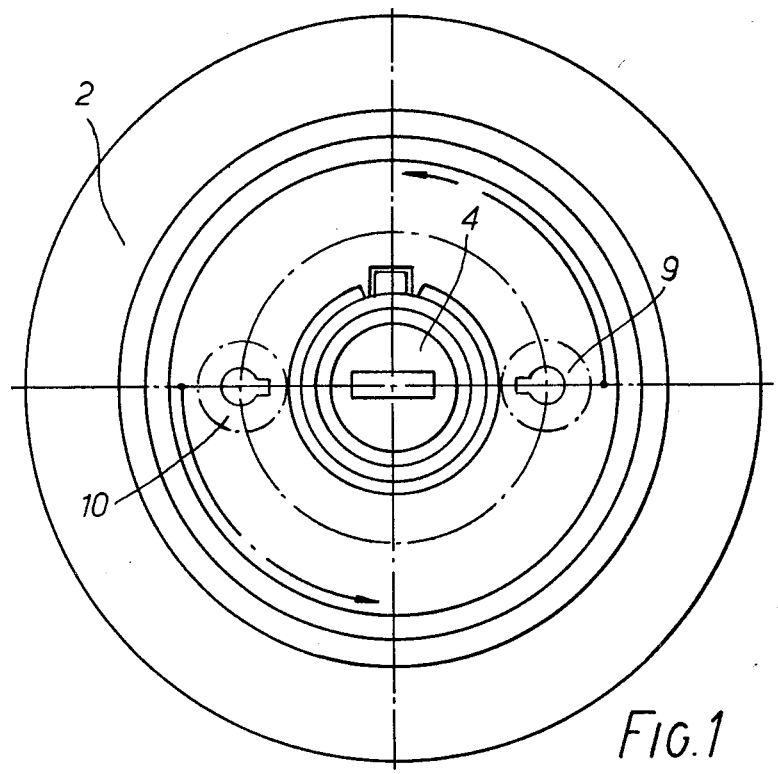
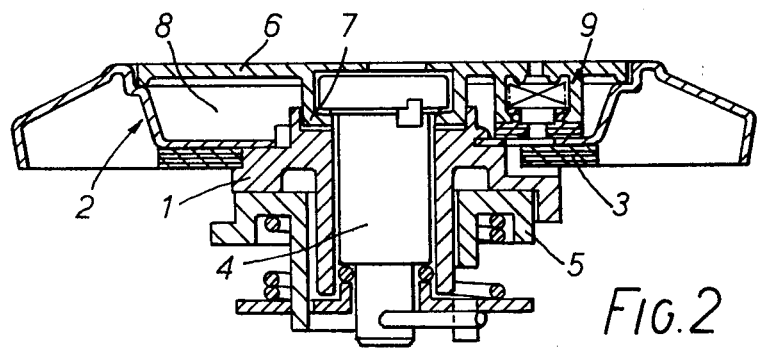

ANTI-THEFT FILLER CAP

BACKGROUND OF THE INVENTION

The invention relates to an anti-theft cap for fuel tanks of automobile vehicles, of the type comprising at least one device for placing the interior of the tank in communication with the exterior in the case of over-pressure or under-pressure within the tank, and a cylinder lock for locking and unlocking the cap.

In order to avoid the risks of explosion of the tank in the case of excess pressure or of implosion in the case of under-pressure, it is necessary to provide a communication between the interior of the tank and the open air.

STATEMENT OF PRIOR ART

For a long time this communication has been permanent, either by provision of an open air connection of the tank itself (ventilated tank), or by provision of this open air connection in the cap of the tank, whether or not of a locking type (unventilated tank). This solution posssesses the drawback of practically constantly liberating petrol vapours to the atmosphere, which are the source of significant pollution of the atmosphere.

To remedy this drawback it has been proposed to permit this communication with the open air only when the pressure within the tank is greater than a specific value (risk of explosion) and when it is below a second specific value (risk of implosion). On the other hand the communication is blocked in the whole range of pressures included between these two specific values.

For this purpose various systems comprising valves, closure members, etc. have been proposed which all present the defect of causing a sudden connection with the open air on opening of the cap.

OBJECT OF THE INVENTION

The present invention proposes to remedy this drawback by means of a novel anti-theft cap, that is to say a cap lockable by rotation of a key, in which a connection of the tank with the open air occurs automatically on rotation of the key to unlock the cap.

SUMMARY OF THE INVENTION

According to the invention there is provided an anti-theft cap for closing a filler pipe of a vehicle fuel tank, comprising a body for location on the filler pipe, a cover portion on said body for extending over the end of the filler pipe to effect closure, a cylinder lock mounted in a bore formed within said body and serving for locking and unlocking the cap, a carrier member connected to said cylinder lock so as to rotate therewith between a locked position and an unlocked position, a conduit formed in said body having one end thereof at a surface of said body and the other end at another surface which other end communicates with the interior of the filler pipe when the cap is in position thereon, and a valve device carried by said carrier member communicating at one end thereof with the atmosphere and at the other end thereof with said one end of the conduit when said carrier is in said locked position.

BRIEF DESCRIPTION OF THE DRAWINGS

The invention will be clearly understood on reading of the following description given with reference to the accompanying drawing, wherein:

FIG. 1 is a plan view of a cap according to one example of embodiment of the invention, certain parts being omitted, FIG. 2 is a sectional view along the line A—A in FIG. 1, the cap being complete.

DESCRIPTION OF PREFERRED EMBODIMENT

Figure 3:
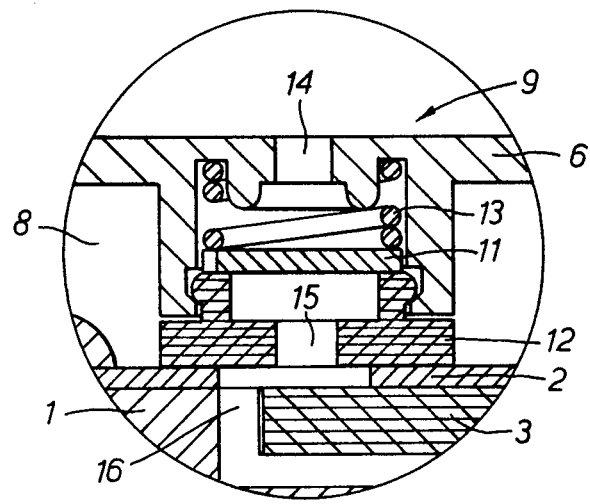
FIG. 3 is a large-scale sectional view of a device for connection with the open air in the case of over-pressure.

The cap as represented in the drawing comprises a fixed body 1 carrying a peripheral rim 2 equipped with a sealing gasket 3 intended to press upon the rim of the filler pipe of the tank. A lock cylinder 4 is rotatably mounted 4 in a central bore of the body 1 and is connected with a movable part 5 of the cap which rotates with said cylinder and effects the locking of the cap to the filler pipe.

Figure 4:
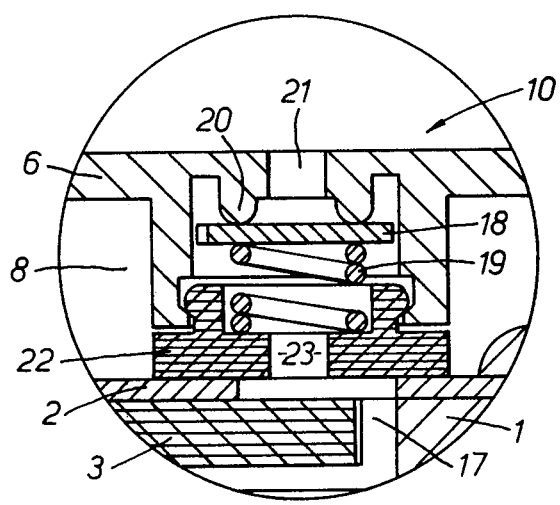
FIG. 4 is a large-scale sectional view of a device for connection with the open air in the case of under-pressure.

A carrier member 6, which also serves as an embellishment is fixed to the head of the cylinder 4 by means of resilient engagement lugs 7. An empty annular chamber 8 is formed between the internal face of the carrier member 6 and the rim 2. The chamber 8 is in communication with the outside air via the clearance between the cylinder 4 and the central bore of the body 1 and/or the carrier member 6 and the rim 2. The member 6 carries an over-pressure valve 9 (FIG. 3) and an under-pressure valve 10 (FIG. 4) disposed diametrically opposite each other, which valves are displaced in the chamber 8 on rotation of the cylinder 4.

The valve 9 comprises a valve member 11 which is thrust towards a sealing pad 12 by a spring 13. An orifice 14 pierced in the carrier member 6 places the space above the valve member 11 in communication with the open air. The pad 12 is pierced with a hole 15 and slides over the upper surface of the rim 2.

When the cylinder 4 is in the locked position (represented in the drawing), the hole 15 in the sealing pad 12 is opposite a conduit 16 formed in the rim 2 and the body 1 and communicates with to the interior of the tank when the cap is mounted on the vehicle. The radially outermost end of the conduit 16 communicates with the interior of the filler pipe via the clearance between the body 1 and the inside surface of the filler pipe. In this position, if the pressure within the tank exceeds a value determined by the calibration of the spring 13, the valve member 11 is raised against the action of the spring 13 and the tank is placed in communication with the open air. As soon as the pressure in the tank has returned to the calibrated value, the valve member 11 falls again and the communication is interrupted.

The under-pressure valve 10, which cooperates with a conduit 17 which analogous with the conduit 16, communicates at its radially outermost end with the interior of the filler pipe and comprises a valve member 18 thrust by a spring 19 towards a seating 20 formed in the embellisher carrier member 6. An orifice 21 places the space above the valve member 18 in communication with the open air. The valve member 18 presses upon a sealing pad 22 pierced with a hole 23. In the locked position, if a pressure is established below a value determined by the calibration of the spring 19, within the tank, the valve 18 is moved away from its seating 20 and the tank is placed in communication with the open air.

The valve member then drops back on to its seating as soon as the pressure has increased.

If the cylinder is rotated by means of the key (not shown) in the direction of the arrows in FIG. 1, which rotation moves the carrier member 6 towards the unlocking position, situated at 90° in relation to the locking position, the sealing pads 12 and 22 slide away from and disengage the inlets of the conduits 16 and 17 at the beginning of this rotation. As soon as this occurs, the tank is placed in communication with the open air via the conduits 16, 17, and the chamber 8 while the cap is still secured to the filler pipe by the movable locking part 5 thus avoiding any risk of the cap being projected away from the filler pipe in the case of process pressure in the tank.

I claim:

1. An anti-theft cap for closing a filler pipe of a vehicle fuel tank, comprising:
   (a) a body for location on the filler pipe,
   (b) a cover portion on said body for extending over the end of the filler pipe to effect closure,
   (c) a cylinder lock mounted in a bore formed within said body and serving for locking and unlocking the cap,
   (d) a carrier member connected to said cylinder lock so as to rotate therewith between a locked position and an unlocked position,
   (e) a conduit formed in said body having one end thereof at an upper surface adjacent said carrier member and the other end at another surface which other end communicates with the interior of the filler pipe when the cap is in position thereon, and
   (f) a valve device carried by said carrier member communicating at one end thereof with the atmosphere and at the other end thereof with said one end of the conduit when said carrier is in said locked position said valve device being moved away from said one end of said conduit when said carrier member is rotated toward said unlocked position.

2. An anti-theft cap according to claim 1, wherein a second conduit is formed in said body having one end thereof at said surface of said body and having the other end at said other surface, and a second valve is provided on said carrier member communicating at one end thereof with the atmosphere and at the other end thereof with said one end of the further conduit when said carrier is in said locked position, wherein the first valve device serves to permit egress of vapour from said tank when the pressure therein exceeds a predetermined value and said second valve device serves to permit ingress of air into the tank when the pressure therein falls below a predetermined value.

3. An anti-theft device according to claim 2, wherein each of said valve devices includes a sealing pad provided with a hole, said pad effecting sealing at the said other end of the valve device and its respective conduit when the valve device is adjacent its conduit with the carrier in the locked position and effecting a sliding movement on said surface of the body away from the conduit when said carrier is rotated into an unlocked position by said cylinder.

* * * * *